United States Patent [19]
Endo et al.

[11] Patent Number: 4,607,287
[45] Date of Patent: Aug. 19, 1986

[54] WOBBLING-SWING DRIVEN IMAGE SENSOR

[75] Inventors: Yukio Endo, Yokohama; Yoshitaka Egawa, Tokyo; Nozomu Harada; Okio Yoshida, both of Yokohama, all of Japan

[73] Assignee: Kabushiki Kaisha Toshiba, Kawasaki, Japan

[21] Appl. No.: 693,152

[22] Filed: Jan. 22, 1985

[30] Foreign Application Priority Data

Jan. 31, 1984 [JP] Japan ................... 59-14292

[51] Int. Cl.⁴ ............................. H04N 3/14
[52] U.S. Cl. .................................. 358/213
[58] Field of Search ............ 358/212, 213, 209; 250/578

[56] References Cited

U.S. PATENT DOCUMENTS

| | | | |
|---|---|---|---|
| 3,944,816 | 3/1976 | Harada | 358/213 |
| 4,131,919 | 12/1978 | Lloyd et al. | 358/213 |
| 4,145,721 | 3/1979 | Beaudouin et al. | 358/213 |
| 4,167,754 | 9/1979 | Naguma et al. | 358/167 |
| 4,320,413 | 3/1982 | Takemura | 358/213 |
| 4,335,406 | 6/1982 | Ohba et al. | 358/213 |
| 4,413,284 | 11/1983 | Izumita et al. | 358/213 |
| 4,479,143 | 10/1984 | Watanabe et al. | 358/44 |
| 4,499,497 | 2/1985 | Levine | 358/213 |
| 4,517,603 | 5/1985 | Epsztein et al. | 385/213 |
| 4,535,363 | 8/1985 | Harada et al. | 358/213 |
| 4,543,601 | 9/1985 | Harada et al. | 358/212 |
| 4,554,586 | 11/1985 | Tanuma et al. | 358/213 |

FOREIGN PATENT DOCUMENTS 53-101939 9/1978 Japan .................. 358/212
58-29275 2/1983 Japan .

OTHER PUBLICATIONS

SID '82 Digest (23.1), 288N289, Image-Shift Resolution Enhancement Techniques for CCD Imagers: K. A. Hoagland: 1982.

*Primary Examiner*—Gene Z. Rubinson
*Assistant Examiner*—Stephen Brinich
*Attorney, Agent, or Firm*—Oblon, Fisher, Spivak, McClelland & Maier

[57] ABSTRACT

A solid-state image sensing device, such as an interline-transfer type charge-coupled device (IT-CCD), produces signal carriers in response to incident light and generates an image pickup signal. One frame of the image signal is formed of two fields. The CCD chip is coupled to fixed bimorph piezoelectric vibrators by which it is given a wobbling-swing drive during image pickup. This wobbling-swing drive is controlled by a vibration controller. This vibration controller controls the vibration mode of the bimorph piezoelectric elements to apply a first vibration (swing vibration) to the CCD such that each pixel cell is displaced to a different sampling position in the plurality of field periods included in one frame period for image pickup, and applying a second vibration, i.e., a swing vibration with wobbling superposed, to the CCD such that each pixel cell is wobbled while picking up an image in each sampling position, which is positioned in each field period.

9 Claims, 21 Drawing Figures

WOBBLING-SWING DRIVEN IMAGE SENSOR

BACKGROUND OF THE INVENTION

The present invention relates, in general, to a solid-state image sensing device and, in particular, to a CCD image sensor which is swing-driven to periodically shift in position relative to incident image light.

In a conventional solid-state image sensor such as an interline transfer type CCD (referred to as an IT-CCD hereinafter), it is easy to understand that the number of picture elements or pixels must be increased to obtain a high resolution video image with the interlaced scanning technique. However, such a conventional IT-CCD with only the standard number of pixels has the largest chip size of common LSIs. If the number of pixels is simply increased in such a CCD to satisfy the need for high integration, its chip size is further increased. On the other hand, in order to increase the number of pixels without changing the present CCD chip size, the integration of pixels must be greatly enhanced (e.g., more than four times). With this approach it is technically difficult to prepare such a high density CCD. Even if development of improved fabrication techniques allows the manufacture of the CCD in the near future, the circuit configuration for driving the CCD becomes complicated and power consumption becomes high, thus entailing new problems.

In order to solve the problem of the number of pixels vs packing density, the CCD may be periodically displaced relative to incident image light, thereby picking up a high resolution image. In two field periods (A and B) constituting one frame period in the NTSC system, when the CCD is swung at an amplitude corresponding to ½ the pixel pitch (PH) such that pixels are positioned in different sampling positions along a horizontal direction, the spatial sampling points along the horizontal direction can be increased. Therefore, the horizontal resolution of the one-frame image can be substantially doubled even if a conventional low resolution IT-CCD chip is used.

With the above swing image pickup technique, however, the resolution of the reproduced image can be improved but the generation of moire cannot be reliably suppressed. This moire generation results in noise, which reduces the quality of the image.

The frequency of the moire effect becomes nearly zero near the threshold of the Nyquist rate causing a rough noise pattern in the reproduced image. Furthermore, when field images picked up by this swing image pickup technique are composed and a single frame image is constructed, the phases of the moire in both field images are mutually reversed so the effect of the noise is increased. Also, because the CCD chip is physically vibrated in relation to the incident image light, as was described above, a moire effect is transferred onto the screen, which was not produced with the prior art image sensor which picks up images in a stationary state. This transfer of the moire effect onto the screen results in deterioration of the image quality and, accordingly, the generation of the moire effect is a major problem with fixed imaging apparatus, which perform swing image pickup.

SUMMARY OF THE INVENTION

It is, therefore, an object of the present invention to provide a new and improved image sensing device capable of attaining higher resolution and better image quality by keeping the moire effect to a minimum.

According to the present invention, an apparatus for picking up incoming image light includes a solid-state image sensor for picking up the image light in accordance with an interlaced scanning technique to generate signal charges representing one frame image consisting of field images. This image sensor has a sensing section provided with at least one linear cell array having cells of a prescribed photoreceptive area to receive the image light and generate and store charges corresponding to the image light, and at least one transferring section arranged adjacent to at least one linear cell array and extending along said cell array to read out and transfer the charges stored in said sensing section. The swing driver unit is coupled to the image sensor and applies the first vibration (swing vibration) to the image sensor such that each pixel is displaced to a different sampling position for image pick up in one frame period, which includes a plurality of field periods. The swing driver unit also simultaneously applies a second vibration (wobbling vibration) to the image sensor such that the pickup operation is performed at each sampling position while wobbling when each pixel (picture element cell) is positioned in each field period.

BRIEF DESCRIPTION OF THE DRAWINGS

The present invention can be best understood by reference to the accompanying drawings, in which.

DETAILED DESCRIPTION OF THE PREFERRED EMBODIMENTS

Figure 1:
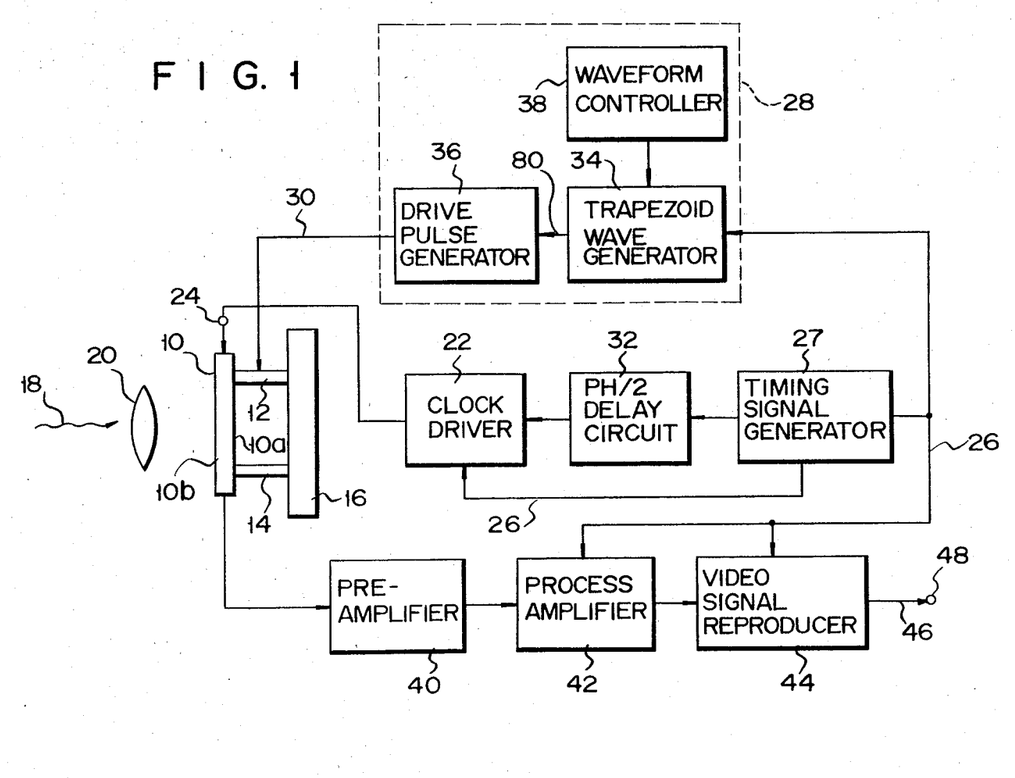
FIG. 1 is a block diagram showing the overall arrangement of a CCD sensing system according to a first embodiment of the present invention.

Referring now to FIG. 1, an interline transfer type charge-coupled device (IT-CCD) 10 is included in an interlaced scanning solid state image sensing system according to one embodiment of the present invention. The IT-CCD 120 has an ordinary number of picture elements or pixels, for example 500×400. The IT-CCD 10 is fixed to a couple of vibrators 12, 14 at the rear side 10a opposite to an image sensing area 10b. The vibrators 12, 14 are comprised of bimorph piezoelectric elements. The vibrators 12, 14 are fixed to a basement or support plate 16. Image light 18 is incident to the image sensor 10 through a lens 20. The vibrators 12, 14 fundamentally vibrate or swing in a plane normal to the incident image light 18 in a horizontal direction. The IT-CCD 10 fixed to the vibrators 12, 14 is thus vibrated or periodically displaced relative to the incident image light 18, thereby performing a basis swing image pickup operation.

A clock driver 22 is electrically connected to the CCD 10 through a gate terminal 24. A timing signal or sync signal 26 is supplied from a sync signal generator 27. The clock driver 22 serves to appropriately drive the CCD 10 in response to the sync signal 26. The sync signal, that is, timing signal 26 is also supplied to a vibration controller 28, which electrically drives the vibrators 12, 14. The vibration controller 28 produces a drive signal 30 in response to the timing signal 26 and supplies the piezoelectric vibrators 12, 14 with the signal 30. A delay circuit 32 connected between the circuits 22, 28 delays the timing of the horizontal readout of the CCD 10 by PH/2 (where "PH" means a horizontal pixel pitch) in synchronism with the vibration pulse period.

The vibration controller 28 includes a trapezoid wave signal gernerator 34 and a drive pulse generator 36. The signal generator 34 generates an electrical trapezoid wave signal under the control of a waveform control circuit 38. The output terminal of the CCD 10 is connected through a preamplifier 40 and a process amplifier 42 to a video signal processing circuit 44, which generates a video signal 46 through a video output terminal 48. The process amplifier 42 and the video output terminal; 48 are operated based on the timing signal 26 supplied from the timing signal generator 27.

Figure 2:
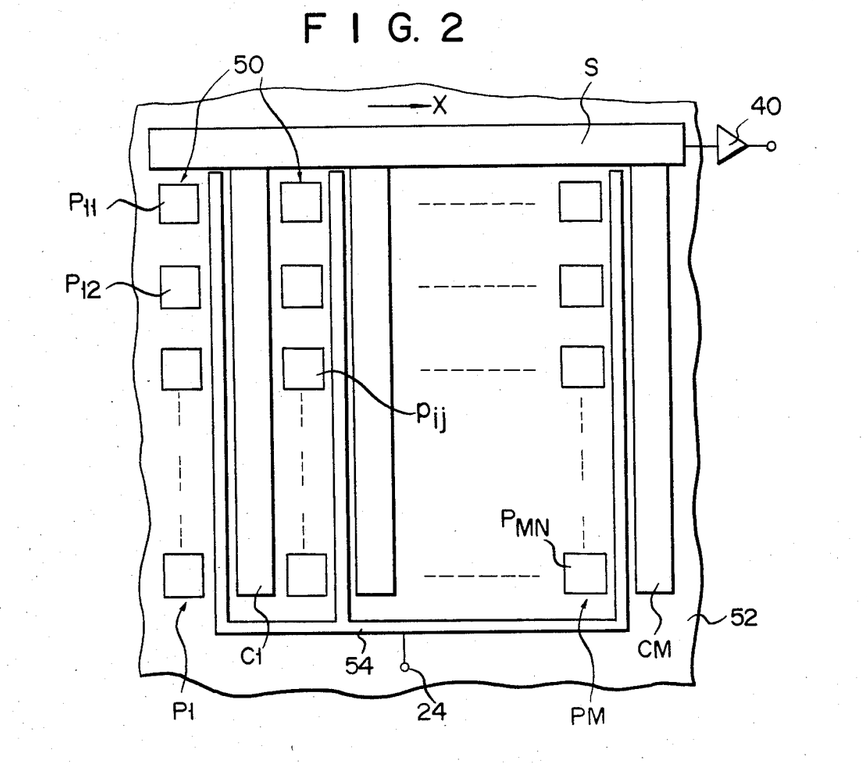
FIG. 2 is a diagram illustrating a plane arrangement of an image sensing region of an interline transfer type charge-coupled device (IT-CCD) included in the image sensing system shown in FIG. 1.

As shown in FIG. 2, the CCD 10 has a photosensing section 50 consisting of a plurality of photosensitive elements or photodiodes p11, p12, ..., pij, ..., pMN of N by M (where, N=500 and M=400, for example). The photodiodes p are arranged on a CCD substrate 52 in matrix manner. M units of vertical CCD shift register elements C1, ..., CM are arranged adjacent and opposite to M lines of photodiodes P1, ..., CM are connected to a horizontal CCD shift register S at their final transferring stages. A field shift gate 54 (referred to as FSG hereinafter) is formed to have gate portions each extending between the vertical photodiode or picture element lines P1, ..., PM and the vertical CCD shift register elements C1, ..., CM.

When a pulse signal (or gate control signal) is supplied from the driver 22 of FIG. 1 to the FSG 54 through the gate terminal 245, signal charges stored or integrated on the photodiodes p due to incident light radiation are transferred to the vertical CCD shift register C. The signal charges transferred to the vertical CCD shift register C are further successively transferred to the horizontal CCD shift register S at every stage. Output signals of the CCD 10 are supplied to the video processor 46 through the amplifiers 42, 44.

Figure 3:
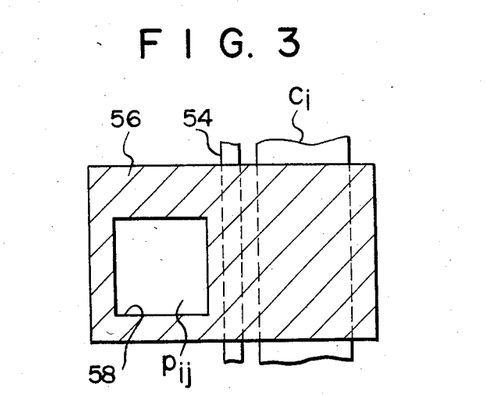
FIG. 3 shows an arrangement of that image sensing region of FIG. 2 which corresponds to one picture element.

In FIG. 3 there is illustrated, on an enlarged scale, an image pickup area of the CCD 10 which corresponds to one picture element of a cell in the photosensitive section 50. A portion 56 of the image pickup area, which is shaded by oblique lines, denotes a metal electrode for shielding incident light. The electrode 56 has an opening 58 and the photodiode pij which corresponds to a single image cell, is located under the opening 58. The vertical CCD shift register Ci and the FSG 56 extend under the electrode 56 and serve, therefore, as nonphotosensitive areas since they are optically shielded by the electrode 56. The electrode 56 also optically separates the adjacent photodiodes from each other.

The CCD 10 included in the first embodiment of the present invention is swing-driven horizontally under a specific vibration mode—which will be explained below—in synchronism with one frame period tF consisting of a couple of field periods ta and tb. In other words, the CCD 10 is "wobbling swing-driven" in such a manner that two different vibration waveforms, first and second vibration waveforms, are composed and simultaneously applied thereto in one frame period. The "wobbling swing-driven" imaging concept according to the present invention will now be described in detail with reference to FIG. 4A and 4B.

Figure 4A:
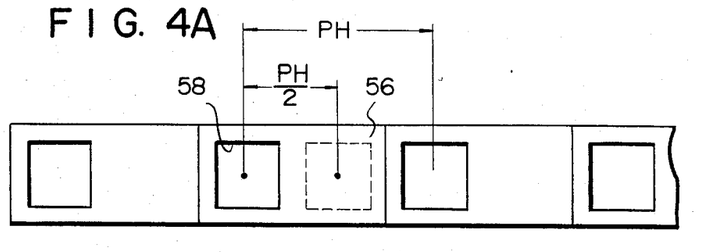
FIG. 4A is a plane view of plural picture element regions illustrating a specific swing image pickup mode (referred to as a wobbling swing-driven image pickup mode hereinafter) attained by the IT-CCD of FIG. 1.
Figure 4B:
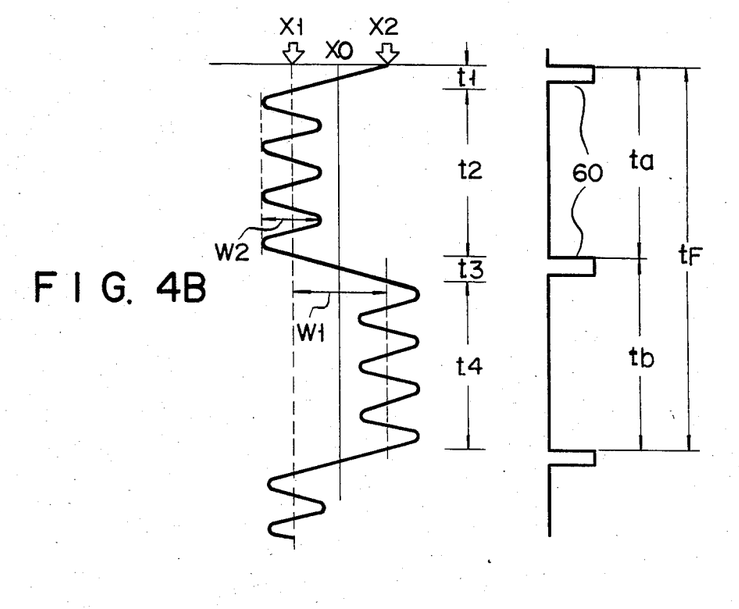
FIG. 4B is a graph showing a vibration waveform of the CCD chip caused corresponding to the picture element region of FIG. 4A.

In order to explain the wobbling-swing mode of the IT-CCD 10, FIG. 4A shows a representation of the image pickup region of a plurality of CCD cells arranged such that the one-cell regions shown in FIG. 3 are aligned along the horizontal direction X. As was stated above, CCD 10 is driven by vibration plate 12 such that there are two different simultaneous vibration modes. Opening 58, which corresponds to one cell region of CCD 10, is vibrated such that it is alternately positioned in the two different sampling positions X1, X2 in the horizontal direction X in the continuous field periods ta, tb. This vibration mode is the basic vibration for the swing pickup, and in this specification is referred to as the "first vibration mode." The center of vibration of the first vibration is shown by X0. The amplitude of the first vibration is the distance W1 between sampling points X1, X2. This distance W1 is set at one half of the horizontal pitch PH (i.e., PH/2) between the CCD cells. The cell opening 58 is positioned at X1 in the field period ta of the first half of one frame period tF, and in the position X2 in the field period of the latter half of the frame period tF in accordance with the first vibration. According to FIG. 4B, cell opening 58 located in the first sampling position X2 is shown by a solid line, while the cell opening in the second sampling position X2 is shown by a broken line. For each field period each cell is displaced between two sampling positions and the incident image light picked up, which results in the resolution in the horizontal direction of one frame image obtained by composing these field images being substantially increased.

CCD 10 is also given another vibration simultaneously. The cell center of opening 58, which corresponds to one cell region of CCD 10, is simultaneously vibrated at a prescribed high frequency in the horizontal direction between the sampling positions X1 and X2. This vibration mode is referred to as the second vibration mode. The center of the vibration of the second vibration, of course, matches positions X1 or X2 mentioned above. The frequency of the second vibration is at least higher than that of the first vibration.

Figure 4C:
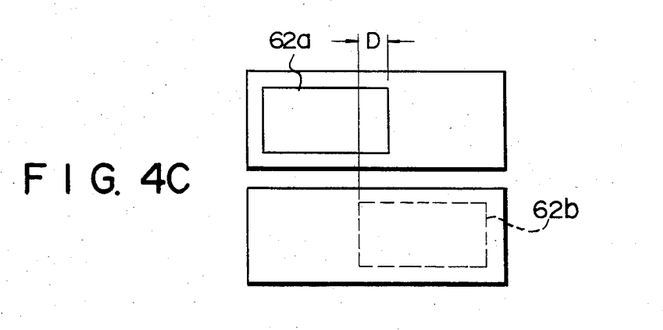
FIG. 4C is a plane view showing light-receiving cell openings which are expanded due to the wobbling at different sampling positions during a field period within one frame period.

At the time of image pickup, the CCD 10 is swing-driven according to a specific swing mode in which the first and second vibrations are mutually superposed so each cell is displaced to the first sampling position X1 in the field period ta of the first half of one frame period tF, and with position X1 as the center, the incident image light is picked up while the CCD is vibrated at a higher frequency. The field shift pulse 60 applied to FSG 54 is generated at the switching times t1, t3 of the field periods ta, tb, and the charges or signal carriers are stored in the cell within period t2, and read out. The cell is displaced to the second sampling position X2 in the field period tb of the following latter half of the same frame period and, simultaneously, with the position X2 as the center, the incident image light is picked up while the cell is vibrated at a higher frequency. The result of this is that, within the field period ta or tb, the effective photosensitive area of cell opening 58 is expanded, as is shown by 62a and 62b in FIG. 4C. In other words, a cell, which has the expanded opening 62a or 62b, can perform swing image pickup in accordance with the first vibration mode. Under such a condition, this cell can be considered to be substantially stationary in the field periods ta or tb of one frame period tF. It should be noted that the amplitude W2 of the second vibration is set such that the expanded cell openings 62a and 62b maintain an overlapping distance D on CCD chip 10 (see FIG. 4C). Consequently, the photosensitive area (the effective cell area) of the pixel in the sampling position of each field period is expanded and the moire generated in each field is reduced.

This reduction in moire comes from the improved mutual cancellation effect obtained when the two field images are added to make one frame image. Accordingly, with wobbling-swing image pickup the resolution can be approximately doubled and, at the same time, flicker noise, which is the source of moire in the reproduced image, can be suppressed to a minimum value.

Figure 5:
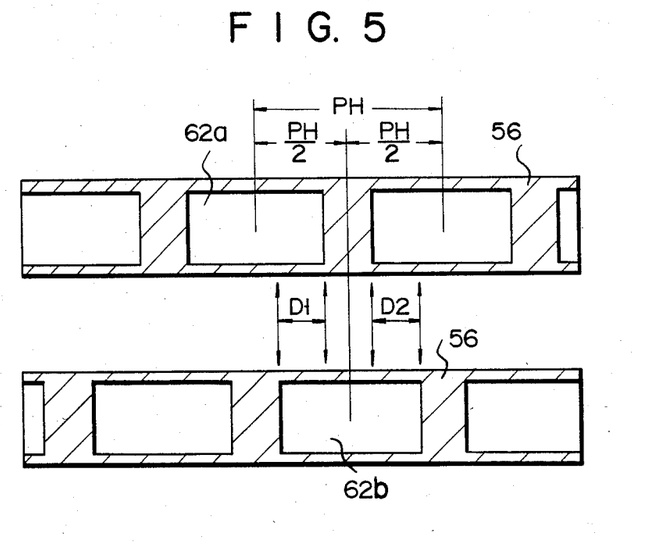
FIG. 5 is a plane view of the expanded cell openings of the CCD chip which is swing-wobble driven during one frame period according to the present invention.

FIG. 5 shows a model of the positional distribution of the expanded cells of the wobbling-swing image pickup CCD. The horizontal arrangement pitch of the CCD with cell openings 62a and 62b which are pseudo-enlarged compared with the prior art opening area by wobbling in each field, is expressed by the same PH that shows the original cell arrangement pitch. Also, the distance between cell openings 62a and 62b, which are displaced to different positions between the A and B fields by the swing vibration in each frame, is one half the horizontal arrangement pitch of the CCD, and is expressed as PH/2. When the cell openings are displaced between the A and B fields of one cell, regions D1 and D2, which can be considered to spatially and mutually overlap therebetween, are produced. As a result, the spatial sampling points of the A and B fields (the area of these sampling points is pseudo-enlarged over the prior art openings) are mutually displaced by 180° in relation to the incident image light. The distribution of the sampling points obtained by the above wobbling-swing image pickup operation is illustrated in FIG. 6.

Figure 6:
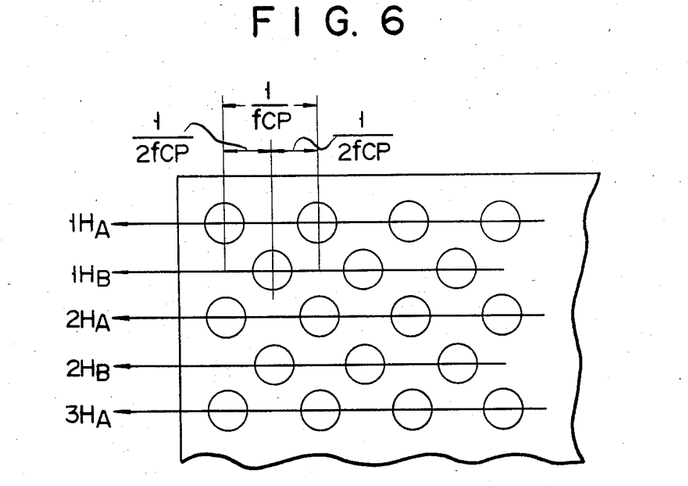
FIG. 6 is a representation of the mechanism for generating individual image signal components during one cycle in the swing-wobble driven image pickup operation mode.

In FIG. 6, 1HA, 2HA and 3HA denote the scanning lines which obtain the sampling points in field A, and 1HB, 2HB and 3HB denote the scanning lines which obtain the sampling points in field B. When these field images are matched with the actual sampling points and displayed, the sampling points on each scanning line of the A and B fields have a pixel pitch twice the CCD horizontal pixel pitch. The time width corresponding to the horizontal pixel pitch PH of the CCD is determined to be the reciprocal of the drive frequency fCP of the CCD shift register S, or 1/2·fCP. Accordingly, the horizontal threshold resolution of the image can be made twice the Nyquist threshold value determined by the drive frequency fCP of the CCD shift register S. The flicker noise from moire that occurs when one simultaneously attempts to improve the resolution using the prior art swing pickup technique, can be greatly decreased by the wobbling vibration in this embodiment, which produces the overlapping areas D1 and D2 between the fields.

In the above image sensing apparatus, which uses the wobbling-swing image pickup concept of this invention, there is no deterioration of the image quality in the reproduced image from the irregular movement of the moire at the time the physical swing is applied to CCD chip 10 using the prior art swing image pickup technique. The reason for this being that in this embodiment the wobbling of the cell opening 58 is at a frequency higher than that of the A and B fields.

Figure 7:
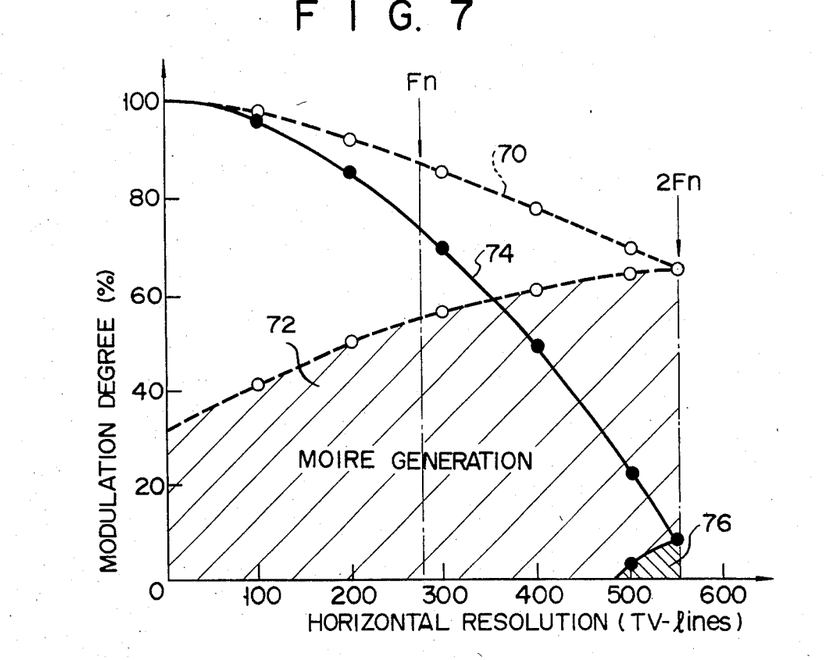
FIG. 7 is a graph showing horizontal resolution vs modulation degree of image pickup signals applied from the swing-wobble driven CCD chip.

FIG. 7 is a graph showing the measured horizontal resolution characteristics obtained in the first embodiment of this invention. The horizontal axis is the horizontal resolution (TV lines) and the vertical axis modulation degree (%). Fn refers to the Nyquist frequency.

In the graph of FIG. 7, broken line 70 is the characteristic curve when swing image pickup is performed at the different sampling points in the different fields (only for the first embodiment). In this case, the horizontal threshold resolution is improved to 2 Fn, which is approximately twice the original Nyquist threshold frequency Fn of the CCD itself. However, the image modulation at the horizontal threshold resolution of 2 Fn is 65%, which is relatively high, so, using this modulation as the reference, a line-patterned incident image develops a moire, and a resolution lower than this modulation (less than a resolution of 550 TV lines) is mixed with the image components. The portion of the broken line 70 sloping to the right is returned at the resolution TV line 550, and defines the moire generation region 72 mixed with the low-resolution image components. As can be understood from this graph, the moire generation region 72 covers a high range and the seriousness of the flicker noise which results in the simple prior art swing image pickup can be vividly seen. The moire frequency approaches zero at 2 Fn so the band in this region is different from the amplitude of the signals between the A and B field images, and as a result flicker noise occurs.

On the other hand, the solid line 74 in FIG. 7 is the characteristic curve obtained when both the first vibration (base vibration) for performing the above swing image pickup operation and the second vibration for making the CCD 10 wobble in each field period are simultaneously applied to the CCD 10, thereby causing the CCD 10 to be "Wobbling-swing driven". As can be readily deducted from curve 74, the image modulation at the horizontal threshold resolution of 2 Fn has been greatly reduced to less than 10% so the moire generation region 76 also is greatly reduced compared to region 72. Accordingly, it was possible to greatly suppress flicker noise, which is the source of moire. In reality, when the wobbling swing drive concept of this invention is applied, the flicker noise in the improved resolution reproduced frame image was reduced to a level invisible to the naked eye.

Figure 8:
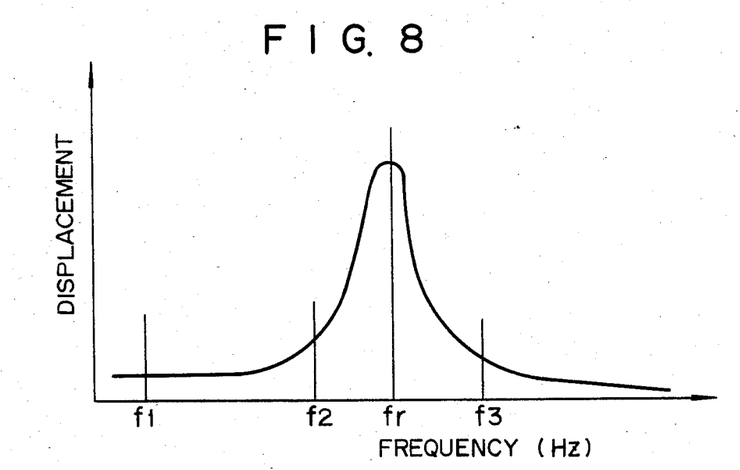
FIG. 8 is a graph showing a displacement generation property of a piezoelectric vibrator element provided for swing-wobble drive of the CCD chip.

The circuit structure shown in FIG. 1 for performing wobbling-swing drive will be described in detail with reference to FIGS. 8, 9A and 9B. The circuit of FIG. 1 is configured to obtain the second vibration, which is superposed on the basic swing mode corresponding to the first vibration waveform. That is to say, the wobbling vibration mode is obtained by using the resonant frequency of the bimorph piezoelectric elements 12, 14. The characteristics of the vibrations produced by these bimorph vibrators 12, 14 are shown in the drawings with the horizontal axis being the applied frequency and the vertical axis being the displacement.

The drive pulse generator 36 included in the vibration controller 28 of FIG. 1 supplies an electrical drive pulse signal 30, which has a suitable vibration waveform, to the bimorph vibrators 12, 14 to vibrate CCD chip 10. The waveform of this drive pulse signal 30 is shown in FIG. 9A. The displacement of bimorph piezoelectric elements 12, 14, which vibrate in response to drive signal 30, sharply increases (as a secondary curve) near the peculiar resonant frequency fr, and at the resonant frequency fr, the maximum displacement is obtained. In this embodiment, fr was set at 200 Hz. At this time, the frequency of the first vibration (the basic swing vibration), shown by f1 in FIG. 8, was set at 30 Hz, and at f2 and f3, it was set at 150 and 250 Hz, respectively.

Figure 9A:
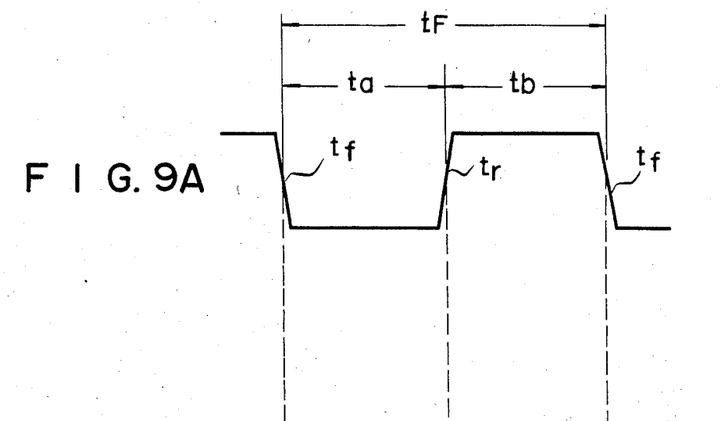
FIG. 9A is a figure showing a trapezoid signal waveform of a swing drive signal supplied to the piezoelectric vibrator.
Figure 9B:
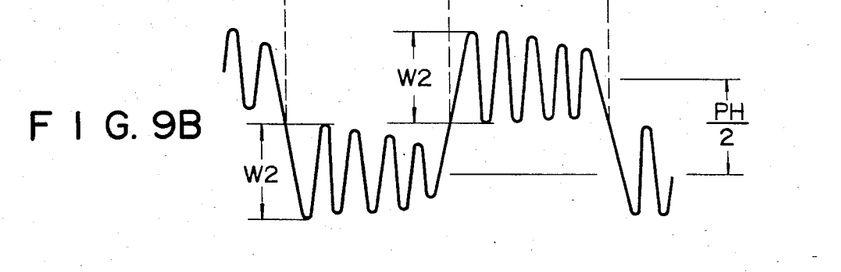
FIG. 9B is a figure showing a signal waveform of a swing-wobble drive signal into which a wobbling drive signal is mixed to define the swing-wobble vibration mode of the CCD.

Timing signal 26 from timing signal generator 27 is supplied to vibration controller 28 and, based on this signal, a vibration drive pulse signal 80 having the trapezoidal waveform shown in FIG. 9A is produced. The rise (tf) and fall (tr) of signal 80 is adjusted by wave controller circuit 38 such that the frequency component of the rise and fall is equal to the resonant frequency fr of the bimorph piezoelectric elements 12, 14. Thus, the vibration waveform, as is shown in FIG. 9B, is suitable for performing the wobbling-swing drive of this invention. It can be readily seen that this waveform is extremely close to that shown in FIG. 4B. It should be noted that amplitude W2 of wobbling vibration of cell opening 58 in each field can be set to the desired value by varying the time length of the rise tf and fall tr.

As was described above, with a structure in which the vibration controller 28 applies a drive pulse signal having the waveform shown in FIG. 9A to the bimorph piezoelectric elements, using the resonant frequency of these elements it is possible to simultaneously produce the first vibration (the basic swing), which displaces CCD 10 to different sampling positions X1, X2 between the fields, and the second vibration (wobbling), which wobbles CCD 10 in each field. The simultaneous generation of mutually different first and second vibrations by one of the bimorph piezoelectric elements 12 (14) has already been confirmed in experiments conducted by the inventor. When the basic swing is performed in response to drive signal 30, the bimorph piezoelectric elements start to resonate at the field change point by the supply of signal components, which are included in the rise tf and fall tr and have a frequency equal to the resonant frequency of the bimorph piezoelectric elements. The resonance vibration of these elements is carried out continuously through the field period, as is shown in FIG. 9B. This resonance vibration is the source of the wobbling in each field. In other words, the elements 12, 14 perform the swing for the image pickup, and at the beginning of another different field period, begin the wobbling vibration at their own particular resonant frequency, and continue this wobbling (this wobbling corresponds to the second vibration of the CCD) at this resonant frequency in that field period. In this way, it is possible to perform the wobbling-swing driven image pickup operation of this invention with a relatively simple circuit structure.

Figure 10:
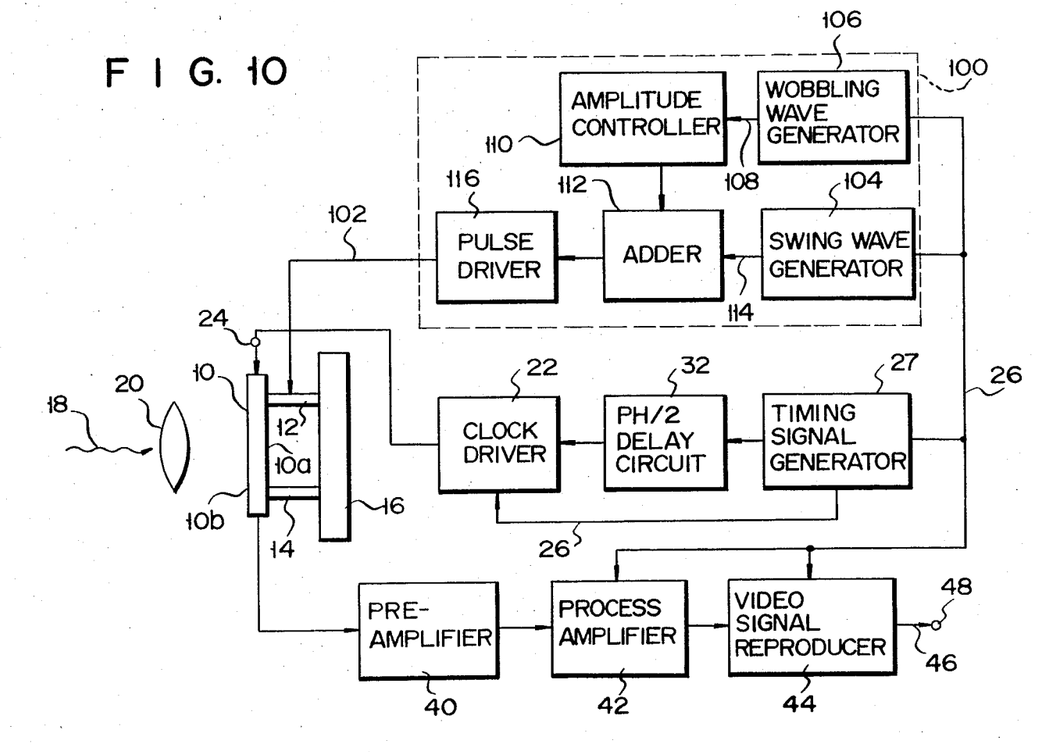
FIG. 10 is a block diagram showing the overall arrangement of a CCD sensing system according to a second embodiment of the present invention.

FIG. 10 shows an image sensing system according to a second embodiment of the present invention. The same reference numerals have been used for the same parts in the first embodiment shown in FIG. 1 and a description has been omitted. In this embodiment, the bimorph piezoelectrical elements are fed electrically to thereby provide another circuit arrangement, which generates the particular vibration required to perform the wobbling-swing driven image sensing operation. In this arrangement, when it is desired to set the wobbling frequency at a frequency other than the resonance frequency of the bimorph piezoelectric elements (higher, for example), this arrangement is particularly effective. Basically, the higher the wobbling frequency in each field of the CCD, the greater the pseudo expansion effect on the cell opening.

In FIG. 10, the vibration controller 100 produces a vibration drive signal 102 simultaneously with the timing signal 26 supplied from the timing signal generation 27. This vibration drive signal 102 is supplied to the bimorph piezoelectrical elements 12, 14. The vibration controller 100 produces exclusive electrical signals, which have a swing vibration waveform and a wobbling vibration waveform, in order for the bimorph piezoelectrical elements 12, 14 to provide the wobbling-swing mode in which the basic swing signal (first vibration) and the sub wobbling signal (second vibration) are superposed. These signals are added and supplied to the elements 12, 14. Accordingly, the vibration controller 100 is comprised of a swing wave generator 104, which exclusively produces an electrical signal that has the waveform of a first vibration, or basic swing vibration, and a wobbling wave generator 106, which exclusively produces an electrical signal that has the waveform of a second vibration, or wobbling vibration. The wobbling wave signal 108 from wobbling wave generator 106 is supplied to adder circuit 112 via amplitude control circuit 110. The trapezoidal swing wave signal 114 output by the swing wave generator 104 is supplied to adder 112 where the two different signals are added to produce the swing-wobbling drive signal 102. Signal 102 is supplied to the bimorph piezoelectrical elements 12, 14 via pulse driver 116.

Figure 11A:
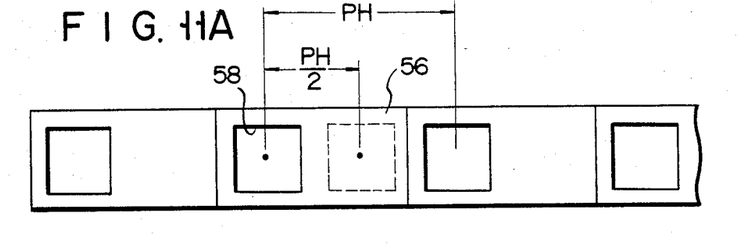
FIG. 11A is a plane view showing plural picture element regions intended to explain a modified wobbling swing-driven image pickup mode attained by the IT-CCD of FIG. 10.

FIG. 11A shows a representation of the image pickup region of a plurality of CCD cells, which correspond to that of FIG. 4A, for explaining the wobbling-swing mode of the IT-CCD 10 included in the second embodiment of FIG. 10. As was stated earlier, CCD 10 is driven by vibration plate 12 such that the two vibration modes are simultaneous. The first vibration (swing vibration) is performed such that opening 58, which corresponds to one cell region of CCD 10, is alternately positioned in the two different horizontal sampling positions X1, X2 in the connected field periods ta, tb. This swing vibration is the same as that in the first embodiment, and the amplitude W1 is set at half the horizontal arrangement pitch PH between the CCD cells (i.e., PH/2).

Figure 11B:
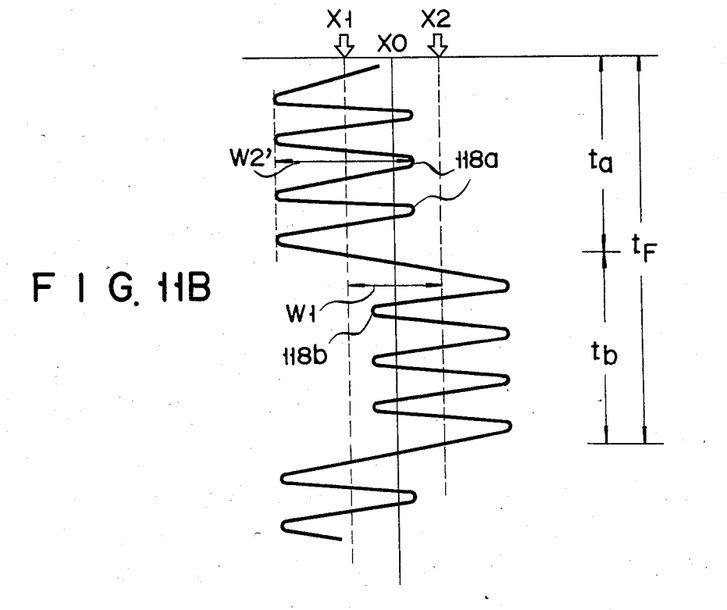
FIG. 11B is a graph showing a vibration waveform of the CCD chip corresponding to the picture element region of FIG. 11A, wherein the amplitude of the wobbling is enhanced to expand the effective cell opening area of the CCD.

In this second embodiment, the amplitude W2' of the second vibration, which is superposed on the first vibration, is set larger than the second vibration amplitude W2 of the first embodiment. This amplitude W2' is set larger than the swing amplitude W1 (=PH/2) and, accordingly, this CCD 10, which is vibrated by the superposed wobbling and swing vibrations, has a wobbling vibration waveform at the two field periods ta, tb in the frame period tF in which the vibration peak 118 crosses the center X0 of the swing vibration, as is shown in FIG. 11B. The frequency of the wobbling is set at least higher than that of the swing, which is the same as in the first embodiment.

Figure 11C:
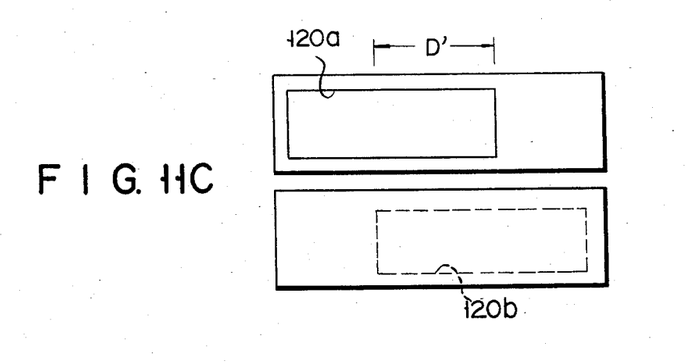
FIG. 11C is a plane view showing light-receiving cell openings which are further expanded due to the wobbling of the CCD at different sampling positions during a field period within one frame period.

When an image is picked up, because CCD 10 is swing-driven according to a specific vibration mode comprising superposed first and second vibrations, each cell picks up the incident image light while, in the field period ta of the first half of the frame period tF, being displaced to the first sampling position X1 and being amplified by a high frequency with the position X1 as the center, and while being wobbled at the amplitude W2'. This cell, in the latter field period tb of the same frame period tF, is displaced to the second sampling position X2 and, at the same time, with the position X2 as the center, picks up incident image light while wobbling with an amplitude W2' and a high frequency. Consequently, the effective photosensitive area of cell opening 58 in the field period ta or tb are greatly expanded (twice the actual area of the opening), as is shown by 120a and 120b of FIG. 11C. The result of this is that noise, such as moire generation in the field image (the resolution of which is slightly decreased in the horizontal direction) and flicker noise caused by the moire and dynamic noise, which results in deterioration of the image quality, can be greatly reduced. By simply controlling the amplitude of the wobbling, it is possible to slightly vary the improvement to the resolution and the prevention of moire generation. This means that the same circuit construction of the vibration controller 100 can be adapted, without variation in hardware, to the different requirements or individual demands of design choice.

Figure 12A:
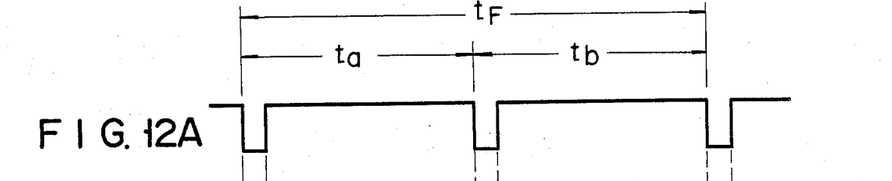
FIGS. 12A to 12E are figures showing signal waveforms of main signals, including a modified swing-wobble drive signal, obtained at the main components of a vibration controller according to the second embodiment of the present invention.
Figure 12B:
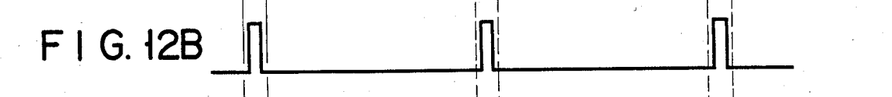
Figure 12C:
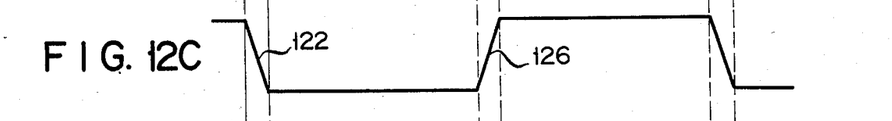

The following is a description of the actual operation of vibration controller 100 of FIG. 10. FIG. 12A shows the waveform of the vertical blanking pulse signal supplied to CCD 10 and FIG. 12B shows the waveform of the field shift pulse signal. Swing wave signal 114 from swing wave generator 104 has a trapezoidal waveform, as is shown in FIG. 12C. Wobbling wave signal 108 from wobbling wave generator 106 is controlled by amplitude controller 110 and, consequently, has the high-frequency sinusoidal waveform shown in FIG. 12D. The frequency of this signal 108 is set higher than the particular resonant frequency of the bimorph piezoelectric elements 12, 14, for example, 250 Hz (corresponding to frequency f3 in the graph of FIG. 8).

Figure 12D:
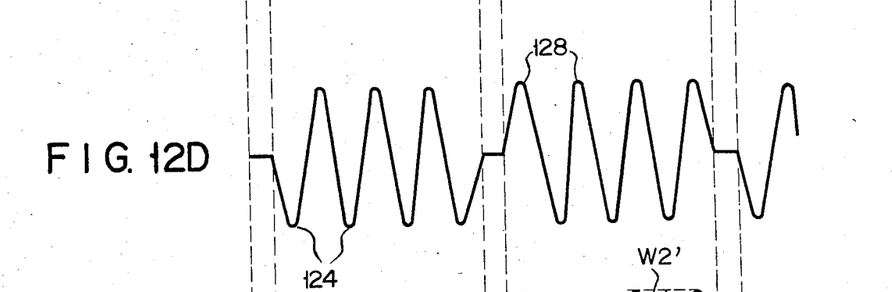
Figure 12E:
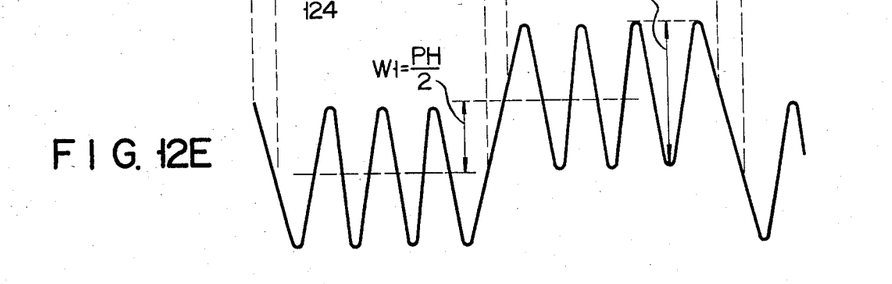

The amplitude-controlled wobbling wave signal with the waveform shown in FIG. 12D is produced in synchronism with the field shift pulse signal and the drive signal having the waveform shown in FIG. 12C. The wobbling wave signal is produced in synchronism with the signal level variation such as the rise and fall of swing drive signal 114. As shown at 122 in FIG. 12C, when signal 114 falls, the wobbling wave signal also falls and has downward (negative) sine wave components 124. Also, when signal 114 rises, as shown at 126 in FIG. 12C, the wobbling wave signal also matches this rise and has upward (positive) sine wave components 128. The wobbling wave signal 108 has $n+\frac{1}{2}$ cycles in each field period, wherein n is clearly defined as zero or a positive integer (n=0, 1, 2, ...). According to FIG. 12D, n=3 was used as the example for illustration. If the wobbling wave signal 108 is set in this way and added with the swing drive signal 114 of FIG. 12C, there is no signal adding loss and the generation of useless harmonic wave components can be prevented.

Although the present invention has been shown and described with respect to particular embodiments, various changes and modifications which are obvious to a person skilled in the art to which the invention pertains are deemed to lie with the scope of the invention.

In the embodiments, the swing direction is set so as to coincide with the CCD horizontal direction X to obtain a doubled image resolution power. However, the swing direction may be changed to coincide with a slanted direction to the CCD horizontal direction X. In this case, the CCD chip 10 is swing-driven in the inclined direction so that each cell opening thereof rests in different sampling positions, which are aligned along the inclined direction, during different field periods ta, tb included in one frame period tF. If the amplitude of the X-axial vibration component is set to have the half of the horizontal pixel pitch PH, the horizontal image resolution can be improved in the same manner decribed above. Under such a condition, the interlacing image sensing is performed not only in the horizontal direction but also in the vertical direction, corresponding to the interlacing scanning in the picture image display. Therefore a high vertical resolution as well as horizontal resolution can be attained.

What is claimed is:

1. An apparatus for picking up incoming image light, said apparatus comprising:
    (a) a solid-state image sensor means for picking up the image light in accordance with an interlaced scanning technique to generate signal charges representing one frame image consisting of filed images, said image sensor means comprising,
    a sensing section provided with at least one linear cell array having cells with a specified photosensitive area to receive the image light and generate and store charges corresponding to the image light, and
    at least one transferring section arranged parallel to at least one linear cell array and extending along said cell array to read out and transfer the charges stored in said sensing section; and
    (b) swing driver means, coupled to said image sensor means, for applying a first vibration to said image sensor means such that each pixel cell is displaced to mutually different sampling positions in a plurality of field periods included in one frame period so that each pixel cell is positioned at one sampling position in each field period, for picking up light, said swing driver means simultaneously applying a second vibration to said image sensor means such that each pixel cell vibrates at one sampling position while picking up light in each field period, whereby the photosensitive area of each cell is substantially expanded to reduce a moire generated in each field.

2. The apparatus according to claim 1, wherein said swing driver means comprises:
   bimorph piezoelectric vibrator means, coupled to said image sensor means, and having a specified resonant frequency;
   drive signal generator means, connected to said vibrator means, for producing an electrical drive signal, which has a substantially trapezoidal waveform, and which varies between first and second signal levels to specify said first vibration mode; and
   waveform controller means, connected to said drive signal generator, for controlling the level variation between said first and second signal levels such that the frequency components, included when said trapezoidal wave drive signal varies between said first and second signal levels, are substantially equal to said resonant frequency of said vibrator means, whereby said drive signal generator means swings according to said first vibration mode, and wobbles according to a second vibration mode at said resonant frequency when a different field period begins, the wobbling continuing at said resonant frequency in this field period.

3. The apparatus according to claim 2, wherein said waveform controller means varies the time required by said trapezoidal wave drive signal for said variation between said first and second signal level to determine the amplitude of said second vibration.

4. The apparatus according to claim 3, wherein said waveform controller varies the time required by said trapezoidal wave drive signal for said variation between said first and second signal level to determine the amplitude of the second vibration such that the photosensitive area of each pixel cell is substantially increased by said second vibration carried out in each field period included in one frame period.

5. The apparatus according to claim 3, wherein said waveform controller varies the time required by said trapezoidal wave drive signal for said variation between said first and second signal level to determine the amplitude of the second vibration such that the photosensitive area of each pixel cell spatially and partially overlaps between the field periods included in one frame period by said second vibration carried out in each field period included in one frame period.

6. The apparatus according to claim 1, wherein said swing driver means comprises:
   drive signal generator means for producing a first electrical drive signal, which specifies said first vibration mode, and producing a second electrical drive signal, which specifies a second vibration mode; and
   vibration generation means, mechanically coupled to said image sensor means and electrically connected to said drive signal generator means, for simultaneously generating said first and second vibration in response to said first and second drive signals, and for swing-driving said image sensor means by vibrating itself in a specified mode of a superposed first and second vibration.

7. The apparatus according to claim 6, wherein said vibration generation means generates said second vibration at a second amplitude large enough that a first photosensitive area of a pixel cell, which is effectively expanded by the second vibration of said pixel cell in a first field period, overlaps a second photosensitive area of said pixel cell, which is effectively expanded by the second vibration of said pixel cell in a second field period.

8. The apparatus according to claim 7, wherein said vibration generating means includes bimorph piezoelectric elements.

9. The apparatus according to claim 8, wherein said drive signal generator means comprises:
   a first signal generator circuit, which produces a rectangular pulse electrical signal simultaneously with said field period as the said first drive signal;
   a second signal generator circuit, which, in each said field period, produces a sinusoidal electrical signal having substantially $n+\frac{1}{2}$ (where n: 0 or a positive integer, n=0, 1, 2, ...) wobbling cycles, as said second drive signal; and
   an adder circuit, connected to said first and second signal generator circuits, for superposing said sine wave electrical signal on said rectangular pulse electrical signal, and supplying these superposed signals to said vibration generating means.

* * * * *